United States Patent [19]
Dahlin et al.

[11] Patent Number: 5,402,874
[45] Date of Patent: Apr. 4, 1995

[54] MOBILE CONVEYOR

[75] Inventors: William G. Dahlin; William S. Pladson, both of Fargo, N. Dak.

[73] Assignee: M Bar D Railcar Tech, Inc., Fargo, N. Dak.

[21] Appl. No.: 258,731

[22] Filed: Jun. 13, 1994

[51] Int. Cl.⁶ .............................. B65G 41/00
[52] U.S. Cl. .................. 198/300; 198/304; 414/393; 414/398
[58] Field of Search ............ 198/300, 304, 311; 414/393, 398

[56] References Cited

U.S. PATENT DOCUMENTS

| | | |
|---|---|---|
| 1,786,665 | 12/1930 | Liggett ........................ 198/300 |
| 1,955,536 | 4/1934 | Cullen ......................... 198/300 |
| 2,584,322 | 2/1952 | Baldwin et al. |
| 3,292,804 | 12/1966 | Veneman |
| 3,302,229 | 2/1967 | Teague, Jr. |
| 3,400,804 | 9/1968 | Phillips |
| 3,689,109 | 9/1972 | Chantland et al. |
| 4,266,899 | 5/1981 | Skeem |
| 4,616,957 | 10/1986 | Burrows et al. ............. 198/311 |

*Primary Examiner*—Joseph E. Valenza
*Attorney, Agent, or Firm*—Burd, Bartz & Gutenkauf

[57] ABSTRACT

A conveyor coupled to a skid motor vehicle operates to unload bulk granular material from a railroad hopper car. The conveyor has an obtuse configured frame supporting an endless belt extended about an idler roller and a driven roller. A hydraulic motor mounted on the frame supplied with hydraulic fluid under pressure from the hydraulic system of the motor vehicle rotates the drive roller thereby moving the belt relative to the frame and mount thereon. A pair of transverse tubular box members are secured to the bottom of the frame to accommodate forks attached to the skid motor vehicle whereby the skid motor vehicle can lift the conveyor and transport it to another location.

28 Claims, 4 Drawing Sheets

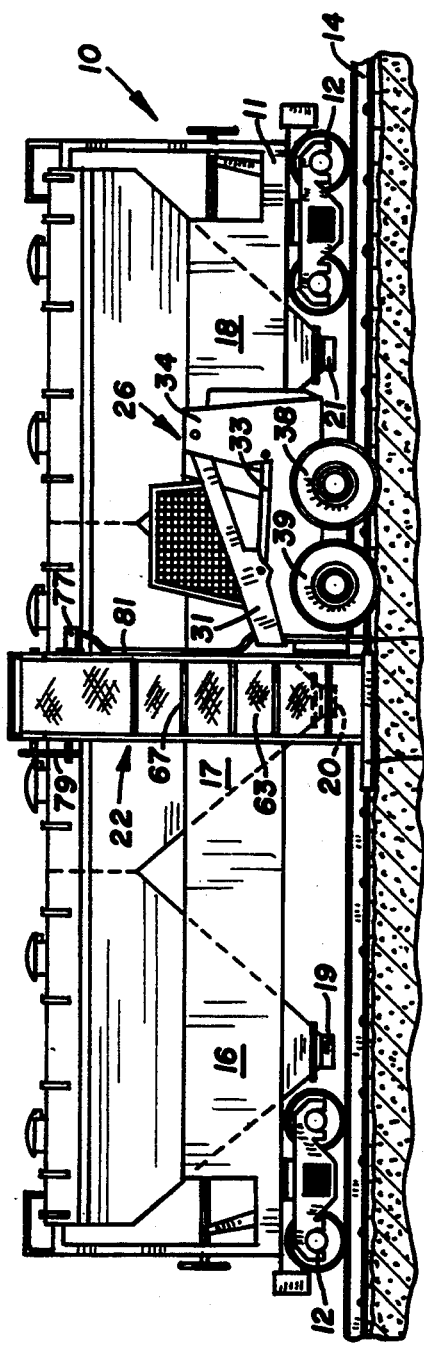
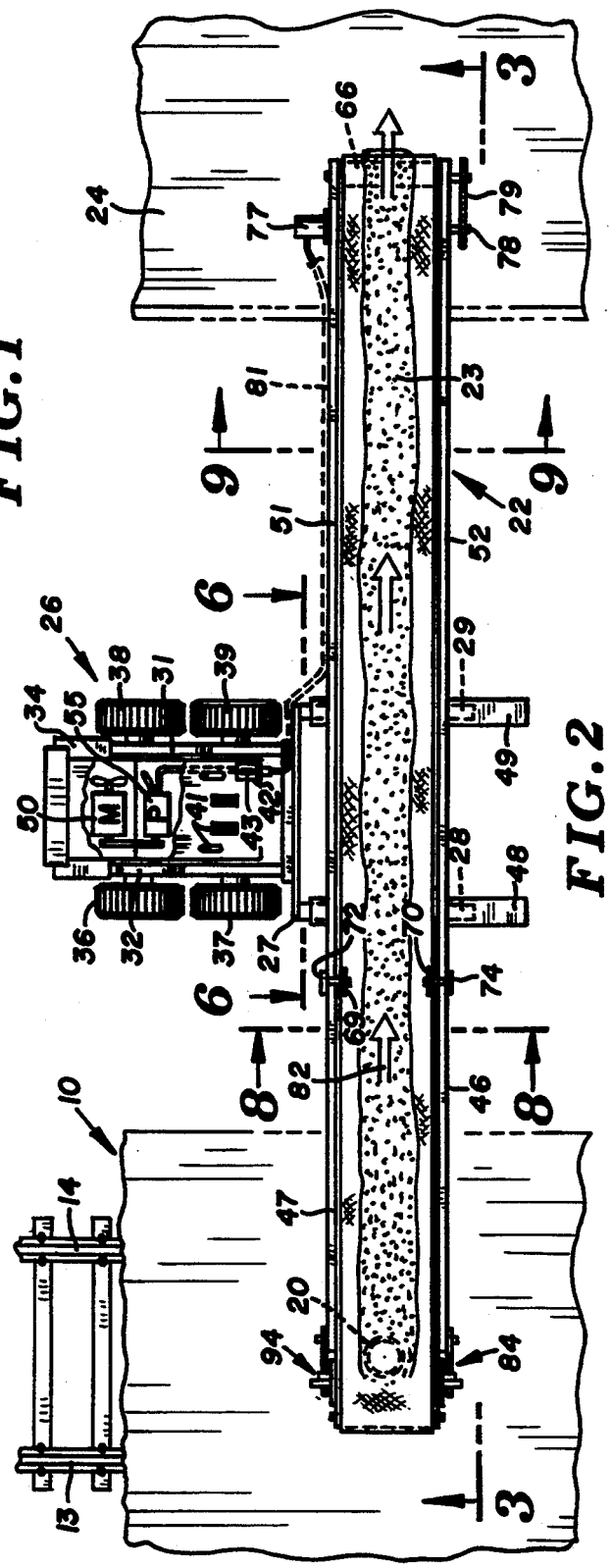
FIG.1
FIG.2

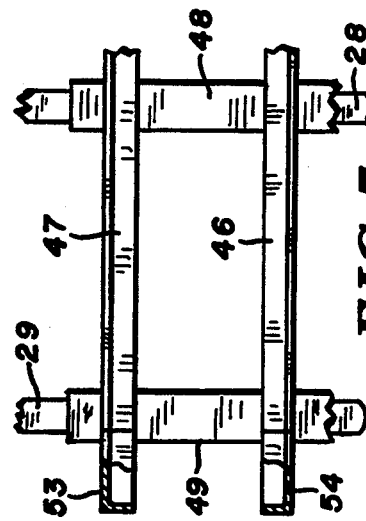
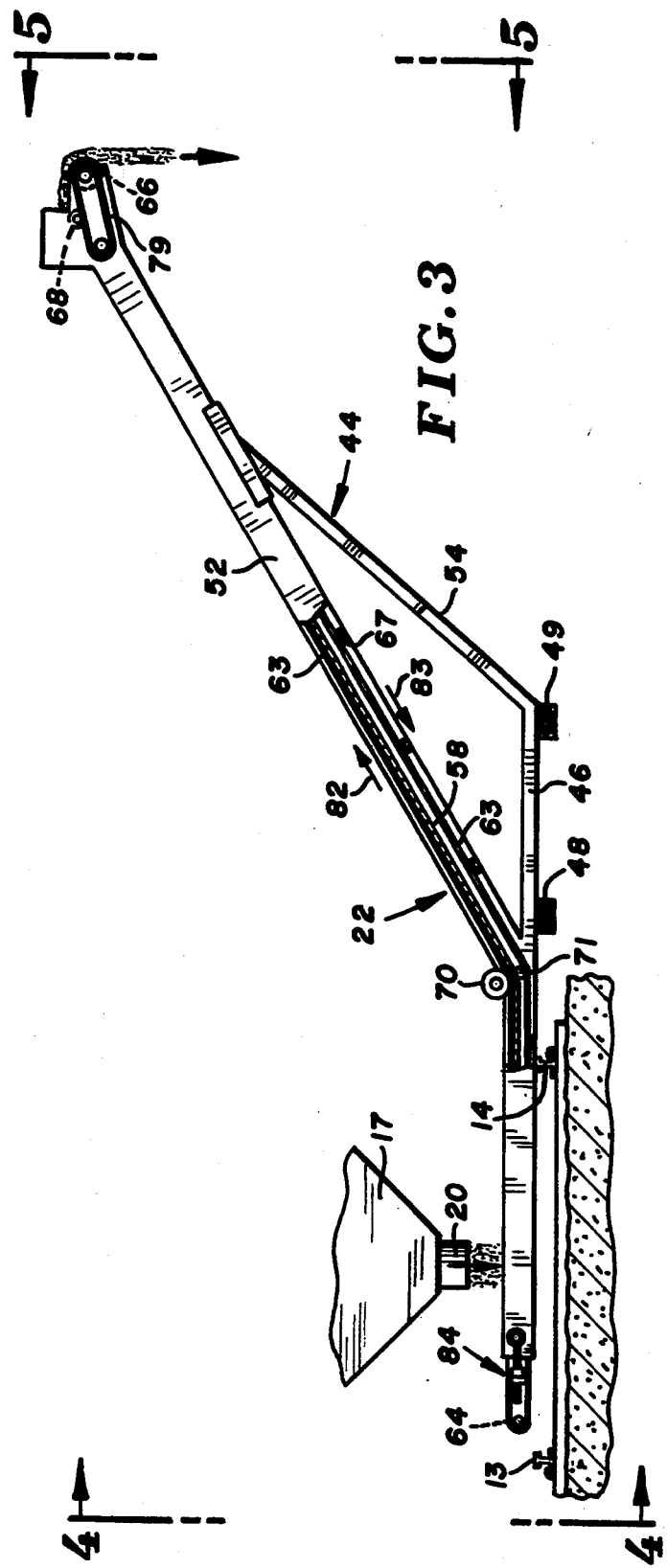
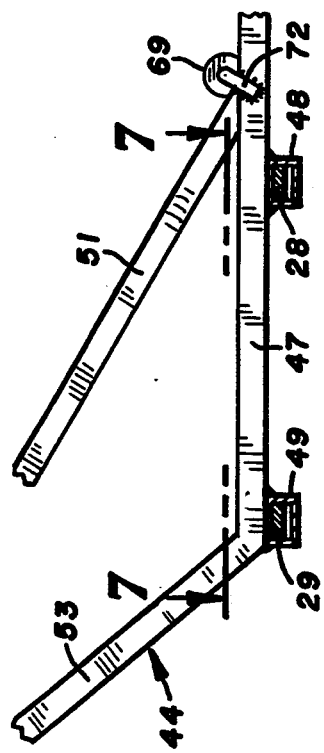

MOBILE CONVEYOR

FIELD OF THE INVENTION

The invention relates to conveyors for unloading bulk materials from railway hopper cars. The conveyor is a mobile conveyor that is carried by a skid motor vehicle which also supplies hydraulic fluid under pressure to operate the conveyor.

BACKGROUND OF THE INVENTION

Hopper railroad cars are used to transport finely divided granular materials including grains, sand, limestone and fertilizers to destinations for utilization in industry and agriculture. The hopper cars have lower discharge gates which allow the bulk materials to flow from the hopper onto a conveyor or into a holding chamber located below the car. Stationary conveyors located adjacent the tracks that support the railroad cars are used to carry the bulk materials to another location such as a transport vehicle or additional conveying systems. The railway car must be moved to align the material discharge gates with the conveyor. This requires time and effort, and increases the liability of the persons operating the conveyor and moving the railway car.

A continuous belt conveyor having a horizontal portion for receiving material from the bottom of a hopper of a railroad car and an upwardly inclined portion for elevating the material to a desired location is disclosed by C. E. Phillips in U.S. Pat. No. 3,400,804. The conveyor is operated with a motor driveably connected to a shaft which rotates the drive roller. A rotor having outwardly directed blades assists in forcing the granular material lying on the belt to move up with the upwardly inclined reach of the belt. The conveyor is not adapted to be coupled to a skid motor vehicle or any other types of vehicles which can be used to lift and transport the conveyor and supply hydraulic fluid under pressure to the motor for operating the conveyor.

SUMMARY OF THE INVENTION

The invention relates to a conveyor for moving bulk material from a first location to a second location and a vehicle for transporting and operating the conveyor. The conveyor is used to unload granular material from a hopper railway car and deposit the material to a selected location such as a truck, conveyor or other means for transporting the bulk material to its selected location. The conveyor is useable to unload bulk material from a truck box, container, or storage area in which the material can be discharged in a downward direction onto the conveyor. The conveyor has a frame having a generally horizontal first section and an upwardly inclined second section joined to the first section. A first roller is rotatably mounted on the first second and a second roller is rotatably mounted on the second section. An endless flexible belt is supported on the frame and trained about the first and second rollers. Wheels engage opposite sides of the belt at the transition between the horizontal and the inclined sections to retain the belt in a generally horizontal position on the first section and a generally inclined position on the second section. The wheels are secured to the frame and engage opposite sides of the belt. A power unit, such a fluid-operated motor, is connected to one of the rollers to rotate the roller and thereby move the belt relative to the frame and around the first and second rollers and wheels. A pair of tubular members are secured to bottom portions of the horizontal portion of the frame to accommodate the forks of the fork assembly of a skid vehicle or hitch on the vehicle. The skid vehicle is a conventional industrial motor vehicle having a pump for generating pressurized hydraulic fluid and a valve for controlling the flow of the fluid to and from the vehicle. Lift arms of the vehicle are attached to a fork assembly or hitch having forwardly directed forks that telescope into the tubular members whereby the fork assembly supports the conveyor in a desired position. Hydraulic cylinders are used to selectively raise and lower the fork assembly so as to raise and lower the conveyor and hold the conveyor in a fixed location. Fluid lines, such as hoses, connect the fluid-operated motor with the valve means whereby the fluid under pressure from the pump operates the fluid-operated motor to move the belt relative to the frame and carry material discharged by the railway hopper to a second location.

The frame of the conveyor has a pair of generally horizontal members having first portions extended along the first section of the frame and second portions extended under the section of the frame. The tubular members are secured to the bottom of the second portions of the horizontal member to support the conveyor in a balanced position on the fork assembly or alternately on the ground. The tubular members extend laterally away from one side of the frame to laterally stabilize the conveyor when it rests on the ground and when it is supported on the forks of the fork assembly of the vehicle. The second section of the frame includes longitudinal inclined side members located on opposite sides of the belt. Each side member has inwardly and downwardly inclined lips that provide support for the opposite side edges of the belt. When the belt is moved relative to the frame, the opposite side edges of the belt are turned upwardly and outwardly and ride on the lips to retain the material on the inclined section of the belt.

The fluid-operated motor that runs the conveyor is coupled directly to the valving structure, such as a control valve, of the motor vehicle so that the source of hydraulic pressure generated by the motor vehicle is used to operate the conveyor. The operator of the vehicle also adjusts the speed of the conveyor with the use of the control valve. Also, the direction of movement of the belt of the conveyor can be reversed with the control valve which reverses the flow of the fluid to the motor. The motor vehicle can be readily disconnected from the conveyor. The hose connecting the hydraulic system of the vehicle with the conveyor is uncoupled. The fork assembly is then lowered until the conveyor rests on the ground. The vehicle is then reversed to withdraw the forks from the tubular members. The skid motor vehicle fork can be used for other purposes without changing parts or altering the fork assembly. Coupling the skid vehicle to the conveyor is quickly accomplished. The forks of the fork assembly are aligned with the open ends of the tubular members. The vehicle is then moved forward until the forks are located within the tubular members. The hose carrying the hydraulic fluid is then coupled to the valve assembly. The operator can then lift and transport the conveyor to a desired location, such as adjacent the side of a railway hopper car, and operate the conveyor without disconnecting the conveyor from the fork assembly.

The following detailed disclosure of the conveyor and the structure for mounting the conveyor on the fork assembly of a vehicle is shown in the drawings, which are described as follows:

DESCRIPTION OF THE DRAWINGS

FIG. 1 is a side elevational view of a typical railroad hopper car and material handling conveyor of the invention operatively coupled to a skid motor vehicle;

FIG. 2 is an enlarged top plan view of the material handling conveyor and skid motor vehicle for transporting bulk material from the hopper car into a receiver, such as a truck box;

FIG. 3 is a side elevational view, partly sectioned, of the material handling conveyor of FIGS. 1 and 2;

FIG. 6 is an enlarged sectional view taken along the line 6—6 of FIG. 2;

FIG. 7 is a sectional view taken along the line 7—7 of FIG. 6;

DESCRIPTION OF THE PREFERRED EMBODIMENT

Figure 5:
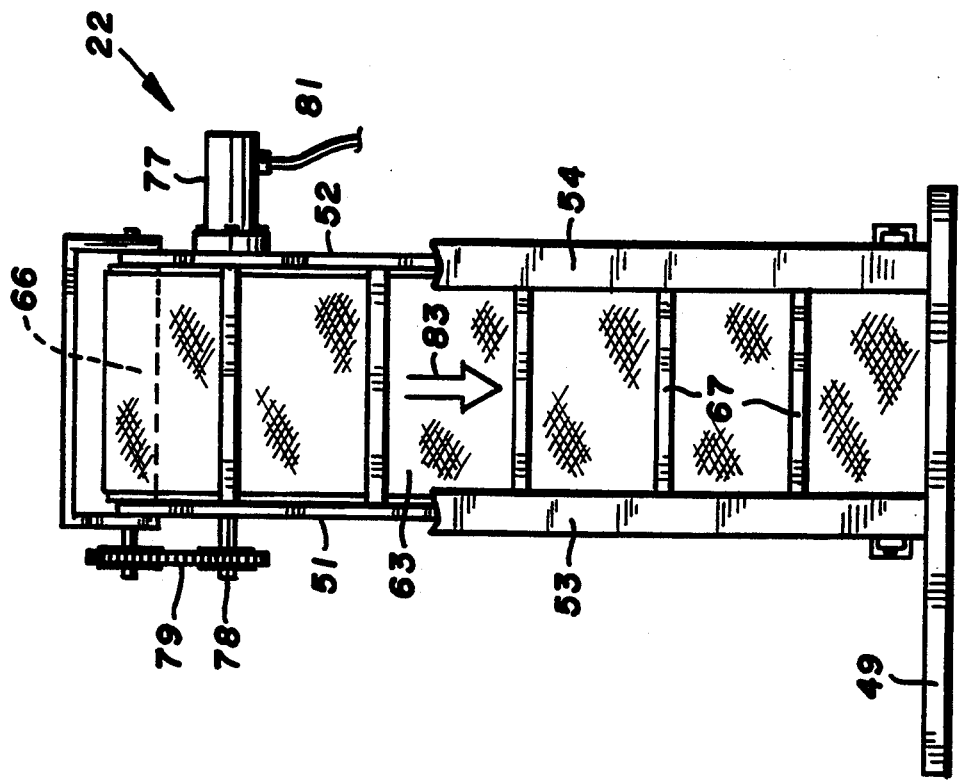
FIG. 5 is a rear elevational view of the material handling conveyor viewing along the line 5—5 of FIG. 3.

Referring to FIG. 1, there is shown a typical railway hopper car, indicated generally at 10, having an elongated horizontal frame 11. A plurality of wheel assemblies or trucks 12 are secured to frame 11 and ride on parallel rails 13 and 14. The rails 13 and 14 extend along the railroad bed and lead to sidings where the hoper cars 10 are loaded and unloaded with granular materials, such as grains, sand, salt, limestone, plastics and like bulk materials. Car 10 has a plurality of hoppers 16, 17 and 18 which have downwardly tapered walls leading to material discharge gates 19, 20 and 21. An example of a conventional railroad hopper car is shown by W. E. Fritz in U.S. Pat. No. 3,306,675.

Material discharge gates 19, 20 and 21 are longitudinally located along the bottom of the hopper car 10 to allow the material in the hoppers to be directed downwardly into bins, stationary conveyors or mobile conveyor 22 for storage or transport to a remote location. Railroad car 10 must be moved relative to rails 13 and 14 to allow each discharge gate 19, 20 and 21 to discharge the granular material onto the stationary conveyor. This requires substantial force to move the railroad car, which increases the time, effort and liability of the persons unloading the granular material from the car.

The material handling conveyor, indicated generally at 22, is a portable material handling machine that can be moved along the railroad bed to receive granular material from each of material discharge gates 19, 20 and 21, or any additional discharge gates incorporated in the railroad car, and deliver the granular material to a receiver, such as truck box 24, as seen in FIG. 2. Conveyor 22 receives the granular material 23 from hopper discharge gate 20 and moves the material laterally and upwardly for discharge into truck box 24. A skid motor vehicle, indicated generally at 26, is used to transport and support the conveyor in its operative position. The skid motor vehicle 26 also supplies hydraulic fluid under pressure to hydraulic motor 77 used to operate the conveyor.

Skid motor vehicle 26 has a front fork assembly 27 equipped with forwardly directed fingers or forks 28 and 29. Fork assembly 27 is connected to a pair of lift arms 31 and 32 that are angularly moved to up and down positions with hydraulic cylinders 33. A hitch adapted to be connected to a bucket or other attachment can be used in lieu of of the fork assembly to lift and transport conveyor 22. The lift arms 31 and 32 and hydraulic cylinders 33 are pivotally connected to upwardly directed rear frames 34. Vehicle 26 has four drive wheels 36, 37, 38 and 39 that are under the control of an operator with the use of hand and foot controls 41. The vehicle 26 has an internal combustion engine 50 and a hydraulic pump 55 that provides hydraulic fluid under pressure to selectively or simultaneously rotate drive wheels 36-39, and raise and lower fork assembly 27. A hydraulic valve assembly 42 having an actuator or handle 43 movable by the operator of the vehicle is used to control the flow and direction of flow of hydraulic fluid under pressure through valve assembly 42 to and from hydraulic motor 77 thereby controlling the speed of operation of conveyor 22.

Figure 4:
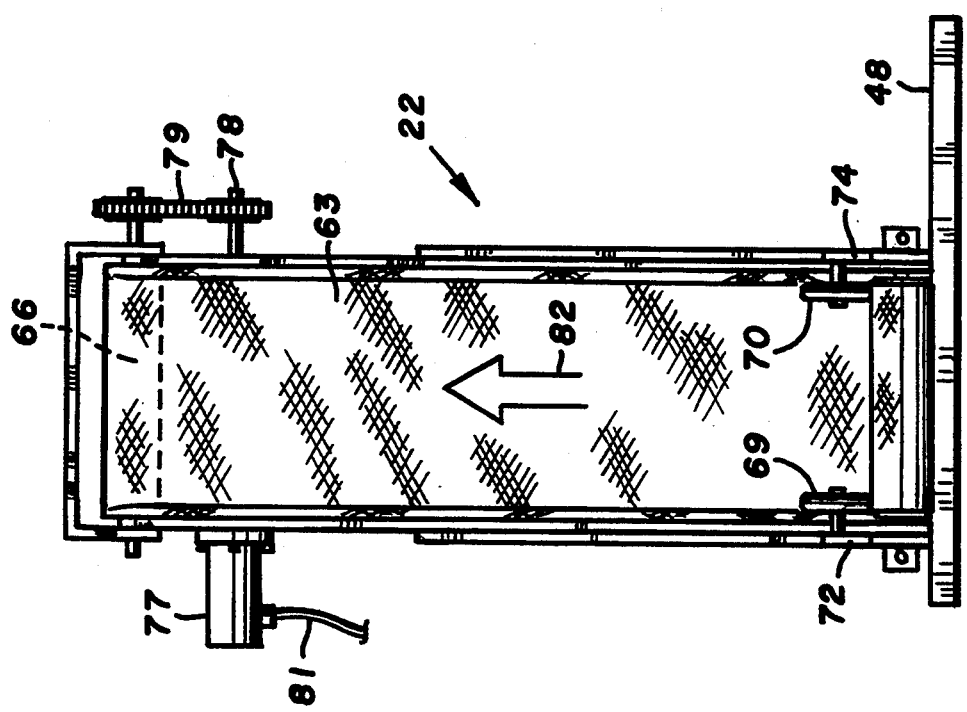
FIG. 4 is the front elevational view of the material handling conveyor viewing along line 4—4 of FIG. 3.

As shown in FIGS. 3, 5, 6 and 7, material handling conveyor 22 has a frame, indicated generally at 44, comprising a pair of parallel horizontal lift members 46 and 47 secured to upwardly incline second members 51 and 52. First members 46 and 47 have inwardly extended sections located below the inclined members 51 and 52. A pair of transverse box beams 48 and 49 are secured to horizontal member 46 and 47 below the lower end of incline members 51 and 52, as seen in FIGS. 3 and 6. Box beams 48 and 49 are tubular members having generally rectangular cross sections secured by welds or the like to the inwardly extended sections of horizontal members 46 and 47. Box beams 48 and 49, as seen in FIGS. 1 and 2, are located transversely of the middle section of the conveyor 22 whereby the conveyor 22 is substantially longitudinally balanced on fork assembly 27. As shown in FIGS. 2, 4 and 5, box beams 48 and 49 project laterally from one side of the conveyor 22 and accommodate the entire lengths of forks 28 and 29 of fork assembly 27. The long box beams 48 and 49 provide lateral support for conveyor 22 on fork assembly 27 and on the ground. Upwardly inclined braces 53 and 54 are joined to the ends of members 46 and 47 and to the mid-sections to incline members 51 and 52 to support members 46 and 47.

Figure 8:
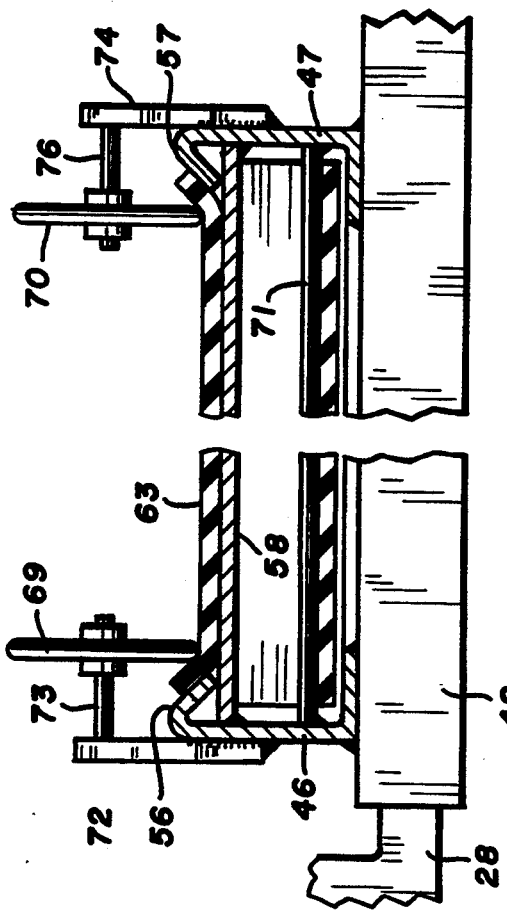
FIG. 8 is an enlarged and foreshortened sectional view taken along the line 8—8 of FIG. 2.
Figure 9:
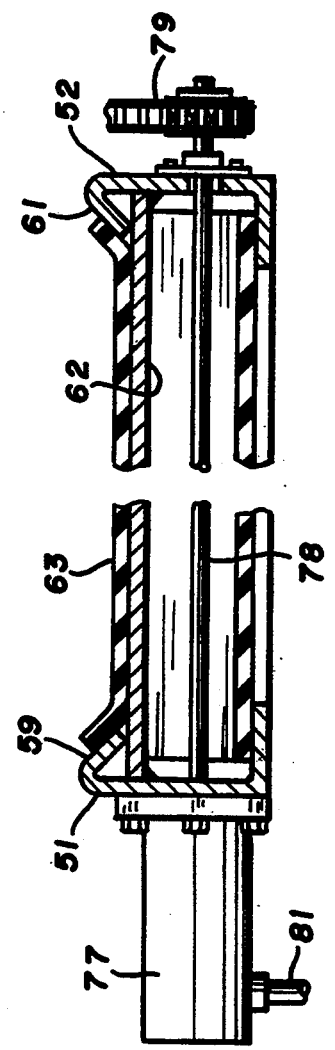
FIG. 9 is an enlarged and foreshortened section view taken along the line 9—9 of FIG. 2.

Referring to FIG. 8, members 46 and 47 have inwardly and downwardly directed lips 56 and 57 that are joined to a transverse, generally horizontal pan or support 58. As seen in FIG. 9, incline members 51 and 52 have inwardly directed lips 59 and 61 extended to a transverse pan or support 62. An endless flexible belt 63 has an upper run that rides on pans 58 and 63, lips 56, 57, 59 and 61 and a lower run that rides on cross bars 67, as seen in FIG. 3. Belt 63 is trained over an idler roller 64 at the inlet end of conveyor 22 and a drive roller 68 at the discharge end of conveyor 22. The upper end of belt 68 rides over an idler roller 68 to provide the belt with a short, generally horizontal section prior to its engagement with drive roller 66. Roller 68 is journaled on the upper ends of frame members 51 and 52.

As seen in FIGS. 2 and 8, a pair of wheels 69 and 71 engage opposite edge portions of belt 63 to facilitate the turning of the top run of belt 63 from a generally horizontal plane to the upwardly inclined orientation of the conveyor. Wheels 69 and 70 turn opposite edges of belt 63 upwardly and outwardly so that the belt 63 has a shallow channel shape as it moves upwardly toward the discharge end thereof. The channel shape of belt 63 aids in the retention of bulk material on the top run of the belt as it moves upwardly and outwardly to the discharge end thereof. Wheel 69 is rotatably mounted on a generally transverse axle 73 connected to an arm 72. Arm 72 is secured to member 46. Wheel 71 is rotatably mounted on a transverse axle 76. Axle 76 is secured to an arm 74 attached to member 47.

The endless belt 63 is driven with a hydraulic fluid-operated motor 77 mounted on the upper end of member 51, as seen in FIGS. 2 and 9. Hydraulic motor 77 rotates a transverse shaft 78 that is connected to a chain and sprocket drive 79. As seen in FIGS. 3 and 5, chain and sprocket drive 79 transmits power to drive roller 66 thereby moving the conveyor to transport bulk granular material from discharge gate 20 to truck box 24. The upper run of conveyor 22 moves in the direction of arrow 82, shown in FIGS. 1, 3 and 4 from idler roller 64 around the transfer rollers 69 and 70, and up the inclined section of the conveyor to drive roller 66. The bottom run of the belt moves downwardly in the direction of the arrow 83, shown in FIGS. 3 and 5, over transverse bar 67 and around transfer roller or bar 71 to idler roller 64. Idler roller 64 is connected to a belt tensioner 84 operable to adjust the tension on the belt 63.

Figure 10:
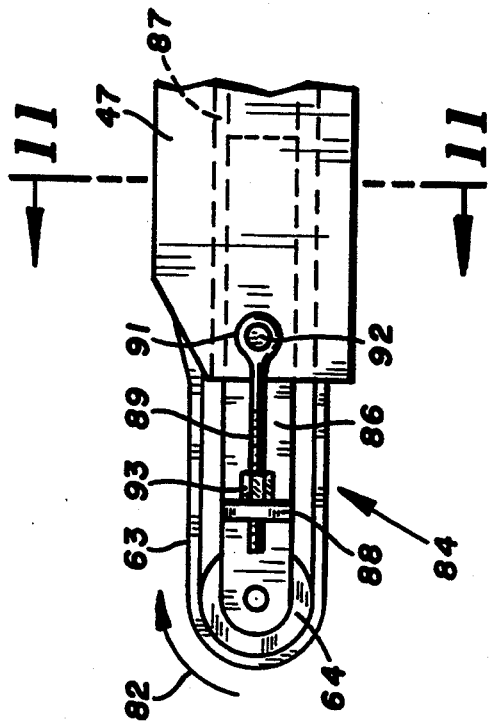
FIG. 10 is an enlarged side elevational view of the front end of the material handling conveyor.
Figure 11:
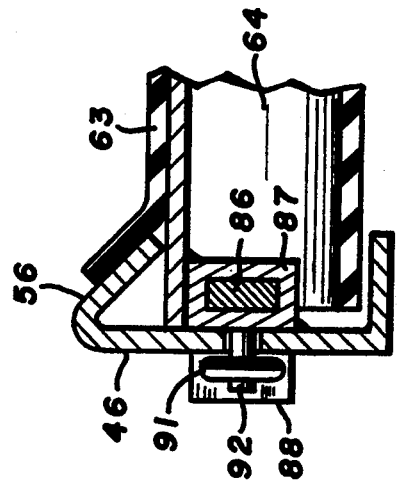
FIG. 11 is an enlarged sectional view taken along line 11—11 of FIG. 10.

Referring to FIGS. 10 and 11, belt tensioner 84 has a plate 86 slideably located in a box beam 87 secured to the inside of member 47. Plate 86 has an outwardly directed ear 88 accommodating a threaded rod 89. Rod 89 extends through a hole in ear 88. Rod 89 has an enlarged head 91 accommodating a pin 92. Pin 92 is secured to box beam 87 and side member 47. A nut 93, threaded on rod 89, engages ear 88. Rotation of nut 93 will move plate 86 relative to box beam 87 thereby adjusting the tension on belt 63. A second belt adjuster, indicated generally at 94 in FIG. 2, is secured to side member 47. Adjuster 94 has the same structure as adjuster 84.

In use, vehicle 26 is used to pick up and transport the conveyor 22 to a selected location whereby the first section of the conveyor is located below a discharge gate, such as discharge gate 20 of the railroad hopper. The lift arms of the vehicle in conjunction with fork assembly 27 is used to pick up and move the conveyor 22. The forks 28 and 29 of the fork assembly 27 telescope into the transverse box beams 48 and 49 whereby conveyor 22 is supported on fork assembly 27. The hydraulic hoses 81 are coupled to valve assembly 42 of vehicle 24 whereby the hydraulic motor 77 is supplied with hydraulic fluid under pressure and a hose for carrying the hydraulic fluid back to valve 42.

The operator of the vehicle utilizes the hand control 43 for valve 42 to control the speed and direction of operation of hydraulic motor 77, as well as to terminate the flow of fluid to the hydraulic motor 77. Conveyor 22, utilizing the source of hydraulic fluid from the vehicle 24, does not need an outside source of power to operate belt 63. The skid motor vehicle 26 can be quickly removed from conveyor 22. The hydraulic quick coupling hose 81 is disconnected from valve 42. The fork lift assembly is then lowered to place the box beams 48 and 49 on the ground. The vehicle is then reversed to retract the forks 28 and 29 from box beams 48 and 49. Skid motor vehicle 26 can be quickly coupled to conveyor 22 by aligning the forks 28 and 29 with the passages of the box beams 48 and 49, and moving the vehicle in the forward direction until the fork lift assembly is fully located within the box beams 48 and 49. The hydraulic hoses 81 are then coupled to the valve 42. The skid motor vehicle 26 is then operable to lift conveyor 22 and move conveyor 22 to a desired location. This can be accomplished when unloading a rail hopper car 10 without moving the hopper car, as the skid motor vehicle 26 can readily move the conveyor 22 to a desired location under any one of the discharge gates 19, 20 and 21 of car 10 or to another car to accomplish the complete unloading of the railway hopper car 10.

While there has been shown and described a preferred embodiment of the conveyor and the coupling of the conveyor to a skid motor vehicle, it is understood that changes in the structure, arrangement of the structure and materials may be made by those skilled in the art without departing from the invention. The invention is defined in the following claims.

We claim:

1. A conveyor for moving material from a first location to a second location and vehicle for transporting and operating the conveyor comprising: a frame having a generally horizontal first section and an upwardly inclined second section joined to the first section, an idler roller rotatably mounted on the first section, a drive roller rotatably mounted on the second section, an endless belt supported on the frame and trained about said idler roller and drive roller, wheel means mounted on the frame engageable with the belt to retain the belt in a generally horizontal position on first section of the frame, fluid operated means connected to the drive roller to rotate said drive roller thereby moving the belt relative to the frame and around said idler roller, wheel means, and drive roller, a pair of tubular members secured to the frame and extended transversely thereof, said vehicle having means for generating pressurized fluid and valve means for controlling the flow of fluid under pressure, a fork assembly having forwardly directed forks telescoped into said tubular members, and means to selectively raise and lower the fork assembly thereby raising and lowering the conveyor, and hose means connecting the fluid-operated means with the valve means whereby the fluid under pressure from the means for generating pressurized fluid operates the fluid-operated means to move the belt relative to the frame and carry material thereon from a first location to a second location.

2. The conveyor and vehicle of claim 1 wherein: the frame includes a pair of generally horizontal members having first portions thereof extended along the first section of the frame and second portions thereof under the second section of the frame, said tubular members being secured to the second portions of the horizontal members.

3. The conveyor and vehicle for claim 2 including: brace means connected to the second portions of the horizontal members and the inclined section of the frame to support the inclined section of the frame.

4. The conveyor and vehicle of claim 1 wherein: the pair of tubular members extend laterally away from one side of said frame.

5. The conveyor and vehicle of claim 1 wherein: the first section of the frame has an extension that extends under the inclined second section of the frame, said tubular members being secured to the extension.

6. The conveyor and vehicle of claim 5 wherein: the tubular members extend laterally away from the extension.

7. The conveyor and vehicle of claim 1 wherein: the second section of the frame includes longitudinal side members, each side member having inwardly and downwardly inclined lips, said belt having opposite side edge portions that ride on the lips during movement of the belt relative to the frame.

8. The conveyor and vehicle of claim 1 wherein: the wheel means comprise a pair of wheels engageable with opposite edge portions of the belt to hold the belt in a generally horizontal position on the first section of the frame and an inclined position on the second section of the frame, and means mounting the wheels on the frame.

9. The conveyor and vehicle of claim 1 wherein: the tubular members are located in the middle section of the conveyor to longitudinally balance the conveyor on the fork assembly of the vehicle.

10. The conveyor for moving material from a first location to a second location and vehicle for transporting and operating the conveyor comprising: a frame having a generally horizontal first section and an upwardly inclined second section joined to the first section, first roller means rotatably mounted on the first section, second roller means rotatably mounted on the second section, an endless belt supported on the frame and trained about said first and second rollers, fluid operated means connected to one of said first or second rollers to move the belt relative to the frame and around said first and second rollers, tubular means secured to the frame and extended transversely thereof, said vehicle having means for generating pressurized fluid and a valve control means for controlling the flow of fluid under pressure, a fork assembly having forwardly directed forks telescoped into said tubular means, and means to selectively raise and lower the fork assembly thereby raising and lowering the conveyor, and hose means connecting the fluid-operated means with the valve means whereby the fluid under pressure from the means for generating pressurized fluid operates the fluid-operated means to move the belt relative to the frame and carry material from a first location to a second location.

11. The conveyor and vehicle of claim 10 wherein: the frame includes a pair of generally horizontal members having first portions thereof extended along the first section of the frame and second portions thereof under the second section of the frame, said tubular means being secured to the second portions of the horizontal members.

12. The conveyor and vehicle for claim 11 including: brace means connected to the second portions of the horizontal members and the inclined section of the frame to support the inclined section of the frame.

13. The conveyor and vehicle of claim 10 wherein: the pair of tubular members extend laterally away from one side of said frame.

14. The conveyor and vehicle of claim 10 wherein: the first section of the frame has an extension that extends under the inclined second section of the frame, said tubular means being secured to the extension.

15. The conveyor and vehicle of claim 14 wherein: the tubular means comprise a plurality of tubular members extend laterally away from the extension.

16. The conveyor and vehicle of claim 10 wherein: the second section of the frame includes longitudinal side members, each side member having inwardly and downwardly inclined lips, said belt having opposite side edge portions that ride on the lips during movement of the belt relative to the frame.

17. The conveyor and vehicle of claim 10 wherein: the tubular means are located in the middle section of the conveyor to longitudinally balance the conveyor on the fork assembly of the vehicle.

18. A conveyor for moving material from a first location to a second location useable with a vehicle for transporting and operating the conveyor, said vehicle having means for generating pressurized fluid and valve means for controlling the flow of pressurized fluid, a fork assembly having forwardly directed forks and means to selectively raise and lower the fork assembly comprising: a frame having a generally horizontal first section and an upwardly inclined second section joined to the first section, first roller means rotatably mounted on the first section, second roller means rotatably mounted on the second section, and endless belt supported on the frame and trained about said first and second rollers, wheel means mounted on the frame engageable with the belt to retain the belt in a generally horizontal position on the first section of the frame, fluid operated means connected to one of said first or second rollers to move the belt relative to the frame and around said first and second rollers and wheel means, tubular means secured to the frame and extended transversely thereof, said tubular means adapted to accommodate the forwardly directed forks of the fork assembly and thereby mount the conveyor on the fork assembly, and means connecting the fluid operated means with the valve means whereby the fluid under pressure from the means for generating pressurized fluid operates the fluid operated means to move the belt relative to the frame and carry material thereon from a first location to a second location.

19. The conveyor of claim 18 wherein: the frame includes a pair of generally horizontal members having first portions thereof extended along the first section of the frame, and second portions thereof under the second section of the frame, said tubular means being secured to the second portions of the horizontal members.

20. The conveyor of claim 19 including: brace means connected to the second portions of the horizontal members and the inclined section of the frame to support the inclined section of the frame.

21. The conveyor of claim 18 wherein: the tubular means extend laterally away from one side of the frame.

22. The conveyor of claim 18 wherein: the second section of the frame includes longitudinal side members, each side member having inwardly and downwardly inclined lips, said belt having opposite side edge portions that ride on the lips during movement of the belt relative to the frame.

23. The conveyor of claim 18 wherein: the tubular means are located in the middle section of the conveyor to longitudinally balance the conveyor on the fork assembly of the vehicle.

24. The conveyor of claim 18 wherein: the wheel means comprise a pair of wheels engageable with opposite edge portions of the belt to hold the belt in a generally horizontal position on the first section of the frame and an inclined position on the second section of the frame, and means mounting the wheel means on the frame.

25. A conveyor for moving material from a first location to a second location useable with a vehicle for transporting and operating the conveyor, said vehicle having means for generating pressurized fluid and valve means for controlling the flow of pressurized fluid, a hitch adapted to be releasably connected to the conveyor and means to selectively raise and lower the hitch comprising: a frame having a generally horizontal first section and an upwardly inclined second section joined to the first section, first roller means rotatably mounted on the first section, second roller means rotatably mounted on the second section, and endless belt supported on the frame and trained about said first and second rollers, wheel means mounted on the frame engageable with the belt to retain the belt in a generally horizontal position on the first section of the frame, fluid operated means connected to one of said first or second rollers to move the belt relative to the frame and around said first and second rollers and wheel means, means secured to the frame releasably attachable to the hitch thereby mounting the conveyor on the hitch, and means connecting the fluid operated means with the valve means whereby the fluid under pressure from the means for generating pressurized fluid operates the fluid operated means to move the belt relative to the frame and carry material thereon from a first location to a second location.

26. The conveyor of claim 25 wherein: the frame includes a pair of generally horizontal members having first portions thereof extended along the first section of the frame, and second portions thereof under the second section of the frame, said hitch being secured to the second portions of the horizontal members.

27. The conveyor of claim 25 wherein: the second section of the frame includes longitudinal side members, each side member having inwardly and downwardly inclined lips, said belt having opposite side edge portions that ride on the lips during movement of the belt relative to the frame.

28. The conveyor of claim 25 wherein: the wheel means comprise a pair of wheels engageable with opposite edge portions of the belt to hold the belt in a generally horizontal position on the first section of the frame and an inclined position on the second section of the frame, and means mounting the wheel means on the frame.

* * * * *